United States Patent
Kang et al.

(10) Patent No.: US 12,136,205 B2
(45) Date of Patent: Nov. 5, 2024

(54) IMAGE-BASED DEFECTS IDENTIFICATION AND SEMI-SUPERVISED LOCALIZATION

(71) Applicant: Samsung Display Co., Ltd., Yongin-si (KR)

(72) Inventors: Yan Kang, Sunnyvale, CA (US); Janghwan Lee, Pleasanton, CA (US); Shuhui Qu, Fremont, CA (US); Jinghua Yao, San Jose, CA (US); Sai MarapaReddy, Newark, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/320,866

(22) Filed: May 19, 2023

(65) Prior Publication Data
US 2023/0316493 A1   Oct. 5, 2023

Related U.S. Application Data

(63) Continuation of application No. 16/938,812, filed on Jul. 24, 2020, now Pat. No. 11,694,319.
(Continued)

(51) Int. Cl.
*G06T 7/00* (2017.01)
*G06F 18/241* (2023.01)
(Continued)

(52) U.S. Cl.
CPC .......... *G06T 7/0004* (2013.01); *G06F 18/241* (2023.01); *G06F 18/251* (2023.01);
(Continued)

(58) Field of Classification Search
CPC .. G06T 7/0004; G06K 9/6268; G06K 9/6289; G06N 20/20; G06N 3/045; G06V 10/70; G06V 20/69
See application file for complete search history.

(56) References Cited

U.S. PATENT DOCUMENTS

| | | | |
|---|---|---|---|
| 10,366,302 | B2 | 7/2019 | Yang et al. |
| 11,062,454 | B1 | 7/2021 | Cohen et al. |

(Continued)

FOREIGN PATENT DOCUMENTS

| | | |
|---|---|---|
| CN | 110309880 A | 10/2019 |
| KR | 10-2019-0113119 A | 10/2019 |
| WO | WO 2019153908 A | 8/2019 |

OTHER PUBLICATIONS

Guo X, Meng L, Mei L, Weng Y, Tong H. Multi-focus image fusion with Siamese self-attention network. IET Image Processing. Jan. 2020, 17(7):1339-46. (Year: 2020).*

(Continued)

*Primary Examiner* — David Perlman
(74) *Attorney, Agent, or Firm* — Lewis Roca Rothgerber Christie LLP

(57) ABSTRACT

A system for manufacturing defect classification is presented. The system includes a first neural network receiving a first data as input and generating a first output, a second neural network receiving a second data as input and generating a second output, wherein first neural network and the second neural network are trained independently from each other, and a fusion neural network receiving the first output and the second output and generating a classification. The first data and the second data do not have to be aligned. Hence, the system and method of this disclosure allows various type of data that are collected during manufacturing to be used in defect classification.

20 Claims, 7 Drawing Sheets

Related U.S. Application Data

(60) Provisional application No. 63/008,480, filed on Apr. 10, 2020.

(51) Int. Cl.

| | | |
|---|---|---|
| *G06F 18/25* | (2023.01) | |
| *G06N 3/045* | (2023.01) | |
| *G06N 3/08* | (2023.01) | |
| *G06N 20/20* | (2019.01) | |
| *G06V 10/70* | (2022.01) | |
| *G06V 10/82* | (2022.01) | |
| *G06V 20/69* | (2022.01) | |

(52) U.S. Cl.
CPC ............ *G06N 3/045* (2023.01); *G06N 3/08* (2013.01); *G06N 20/20* (2019.01); *G06V 10/70* (2022.01); *G06V 10/82* (2022.01); *G06V 20/69* (2022.01); *G06T 2207/10056* (2013.01); *G06T 2207/10116* (2013.01); *G06T 2207/20081* (2013.01); *G06T 2207/20084* (2013.01)

(56) References Cited

U.S. PATENT DOCUMENTS

| | | |
|---|---|---|
| 2016/0163035 A1 | 6/2016 | Chang et al. |
| 2018/0270474 A1 | 9/2018 | Liu |
| 2018/0341829 A1 | 11/2018 | Kigawa |
| 2019/0073568 A1 | 3/2019 | He et al. |
| 2019/0188840 A1 | 6/2019 | Geva et al. |
| 2019/0266501 A1* | 8/2019 | Tavares .................. G06N 5/04 |
| 2019/0294915 A1 | 9/2019 | Geva et al. |
| 2019/0333199 A1 | 10/2019 | Ozcan et al. |
| 2020/0342600 A1* | 10/2020 | Sjöstrand ............... A61B 6/032 |
| 2020/0357143 A1* | 11/2020 | Chiu .................. G06F 18/253 |
| 2021/0239623 A1 | 8/2021 | Sofer et al. |

OTHER PUBLICATIONS

Woo et al., "CBAM: Convolutional Block Attention Module," The Computer Vision Foundation, ECCV, 2018, pp. 1-17; http://link.springer.com/conference/eccv.

Li et al., "HAR-Net: Joint Learning of Hybrid Attention for Single-stage Object Detection," Journal of Latex Class Files, vol. 14, No. 8, Apr. 2019, pp. 1-10.

Wang et al., "Reesidual Attention Network for Image Classification," Computer Vision Foundation, CVPR, pp. 1-9.

* cited by examiner

IMAGE-BASED DEFECTS IDENTIFICATION AND SEMI-SUPERVISED LOCALIZATION

CROSS-REFERENCE TO RELATED APPLICATION

This application is a continuation of U.S. patent application Ser. No. 16/938,812, filed on Jul. 24, 2020, which claims the benefit, under 35 U.S.C. 119(e)(1), of U.S. Provisional Application No. 63/008,480 filed on Apr. 10, 2020, the contents of both of which are incorporated by reference herein.

BACKGROUND

The display industry has grown rapidly in recent years. In keeping up with the demand, new types of display panel modules and different production methods are being deployed and product specifications are being tightened. Maintaining production quality amidst these changes often calls for enhanced equipment and quality control methods. More specifically, early fault detection, abnormal process status predication, and quality fault prediction are desired.

In manufacturing display panels, a defect review system is used to classify defects and help determine the root cause of the defect. The defect review system typically accomplishes this by acquiring high-resolution (sub-micron level) images around defect areas. Based on the acquired images, an operator can classify the defects into categories in accordance with the type of the defects and how the defects may affect the production yield. In more detail, an operator samples a number of defect images and spends significant time searching for features to separate unclassified defect images into categories. Not only is this process time-consuming, it lacks consistency because classifications vary from operator to operator.

Automated defect classification systems have been developed to address the speed and consistency issues above. Some systems use complex machine learning approaches. Achieving the desired level of speed and accuracy, however, remains a challenge due to various factors such as different types and high number of images, accurate identification of a defect (if any) in each of those images, and determination of how much weight/significance to put on each defect.

A faster and more accurate image-based defect detection/identification (IBDI) system is desired.

SUMMARY

In one example, a system for manufacturing defect classification is presented. The system includes a first neural network receiving a first data as input and generating a first output, a second neural network receiving a second data as input and generating a second output, wherein first neural network and the second neural network are trained independently from each other, and a fusion neural network receiving the first output and the second output and generating a classification. The first data and the second data do not have to be aligned with respect to each other.

In another example, a computer-implemented method for classification is presented. The method entails receiving a first output from a first neural network that takes first data as input, receiving a second output from a second neural network that takes second data as input, wherein the first neural network and the second neural network are trained independently of each other, and receiving the first output and the second output into a fusion neural network to generate a final classification.

DETAILED DESCRIPTION

Figure 1:
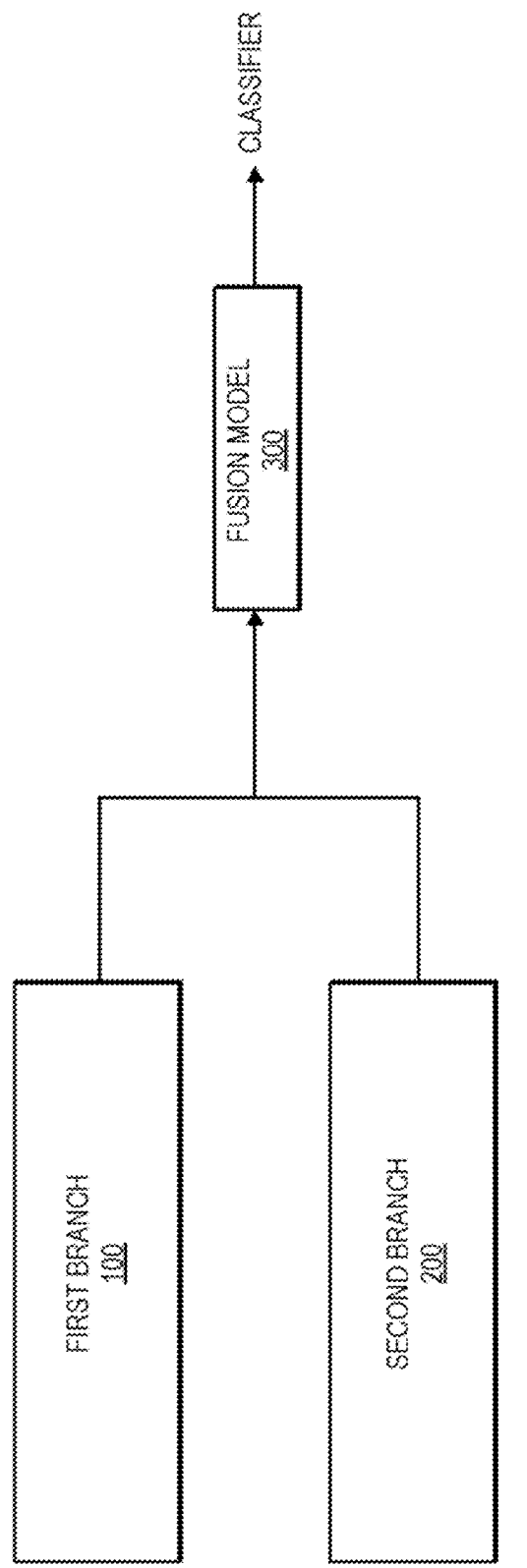
FIG. 1 is a diagram that depicts a classification method utilizing a fusion neural network.

Limited work has been done on the automated defect identification problem, and the available work pertains to working with single source of image. This disclosure pertains to an automated Image-Based Defects Identification (IBDI) system using a model where sets of data are each trained in their own "branch" of the overall neural network and joined by a convolutional neural network taking inputs from the plurality of branches. In this model, the branches are divided according to data sources. Data sources are different types of image sources. Data sources in the different branches do not have to be aligned with respect to each other. That is first data received at a first neural network branch from a first data source may be unaligned with second data received at a second neural network branch from a second data source. For example, one or more images included in the first data may have been captured at one or more orientations that differ from one or more capture orientations of one or more images included in the second data. Within each branch, however, data may be aligned. For example, the one or more images in the first data may each have the same capture orientation.

Although the disclosure is provided in the context of display panel manufacturing, the inventive concept may be applied to other image-based defect identification, such as for semiconductor manufacturing. Also, while the disclosure is presented in the context of branches being divided up according to image sources or alignment, it is possible to divide up the branches according to different criteria. It should also be noted that while the disclosure is in the context of two branches, this is not a limitation of the inventive concept and adaptation to more branches is possible.

Proper defect classification is key to accurate defect identification. The defect layer classification decision is made from images and layer list. A layer list includes the different physical regions (i.e., layers) of a product in the images, and is used to match sections of the images with the layers. For example, for a B-Spot defect analysis, the defect layer may be automatically detected given proper EDS such as High-Angle Annular Dark-Field (HAADF), and TEM images, given proper interpretation by a trained Neural Network using spatial and channel distribution data.

The models of the present disclosure are built to achieve high accuracy across all possible defect layers using a limited amount of data, and the models are trained with augmentation and regularization methods that exploit additional data sources. During manufacture, various types of data are sampled or extracted from various sources. The extracted data, however, may not be well-aligned (e.g., the scale and/or orientation of images is not aligned across multiple pieces of equipment and data sources). Hence, the various types of data are not able to be used simultaneously in existing models. The disclosure pertains to a new method of utilizing this unaligned data.

As a related effect, incorporating the new data into the model (along with changes to the models) allows for the neural network decisions to be more human-understandable and human reviewable. This is because human technicians used to manually classify defects based on these data, and incorporation of the data makes the neural network decision-making more similar to the manual decision-making. In other words, the traditional problem where a trained neural network decision is a "black box" is reduced.

FIG. 1 depicts a classification method utilizing a fusion neural network. The method entails receiving or obtaining a first set of data in a first neural network branch 100, receiving or obtaining a second set of data in a second neural network branch 200, fully training each branch independently of the other branch, and joining the first branch 100 and the second branch 200 through convolutional layers 300. The first set of data may be internally aligned, the second set of data may be internally aligned, and the first and second sets of data may not be aligned relative to each other. In one embodiment, the data sources for the first branch 100 may be spectroscopy images, such as Energy-Dispersive X-ray Spectrocopy (EDS) used with High-Angle Annular Dark-Field (HAADF) images, and the data sources for the second branch 200 may be microscopy images such as Transmission Electron Microscopy (TEM) images. For simplicity of description, "first branch 100" and "spectroscopy branch 100" will be used interchangeably, and "second branch 200" and "microscopy branch 200" will be used interchangeably in the specific context of the example embodiment.

Each of the first branch 100 and the second branch 200 includes a respective attention module. The attention module for a neural network branch (e.g., the first neural network branch 100 or the second neural network branch 200) is configured to overlay a spatial attention onto the images received by the neural network branch to highlight areas where a defect might arise. To illustrate, a first attention module of the first branch 100 may overlay a first spatial attention heat map onto the first set of data received by the first branch 100, and a second attention module of the second branch 200 may overlay a second spatial attention heat map onto the second set of data received by the second branch 200. The attention module includes a space map network (e.g., corresponding to the spatial attention heat map) which is adjusted based on a final predicted label (error type/no error) of an input image. The space map network represents a spatial relationship between the input image and the final predicted label.

The first set of data 100, which may be a set of spectroscopy images, comes in multiple channels (X channels in this example), each channel representing data related to specific chemical element or composition. Each neural network branch includes a channel attention module and a spatial attention module in the form of a CBAM (described below). In addition, a branch that uses a multiple-image source, such as the first branch 100, may include an extra channel attention module 110 (see FIG. 2). The additional channel attention module 110 indicates which element input channels to focus on.

The spatial attention module and the channel attention module are networks that are trained in a semi-supervised manner to force the larger neural network (e.g., the respective neural network branch) to put greater weight on data coming from the selected channel or spatial region. In training, the spatial/channel attention module learns which features are associated with errors, and in turn which spatial areas or channels are associated with the error via the associated features. Once trained, these modules operate within the larger neural network structure to force the neural network to pay "more attention" to select regions/channels (e.g., by setting one or more weights associated with the regions/channels). In some embodiments, the attention modules may be included in a Convolutional Block Attention Module (CBAM), which is an effective attention module for feed-forward convolutional neural networks. Both the spectroscopy branch and the microscopy branch may include a CBAM which provides spatial and channel attention. The spatial attention is a space-heat map related to error location, and the channel attention is related to the color/grayscale channel of the data.

As mentioned above, within the spectroscopy branch 100, there may be an extra channel attention module in addition to a CBAM. The CBAM provides a spatial heat map and color-channel attention feature. Thus, the additional channel attention module focuses attention on the channel that is associated with the target element that is of interest to the particular defect type.

Figure 2:
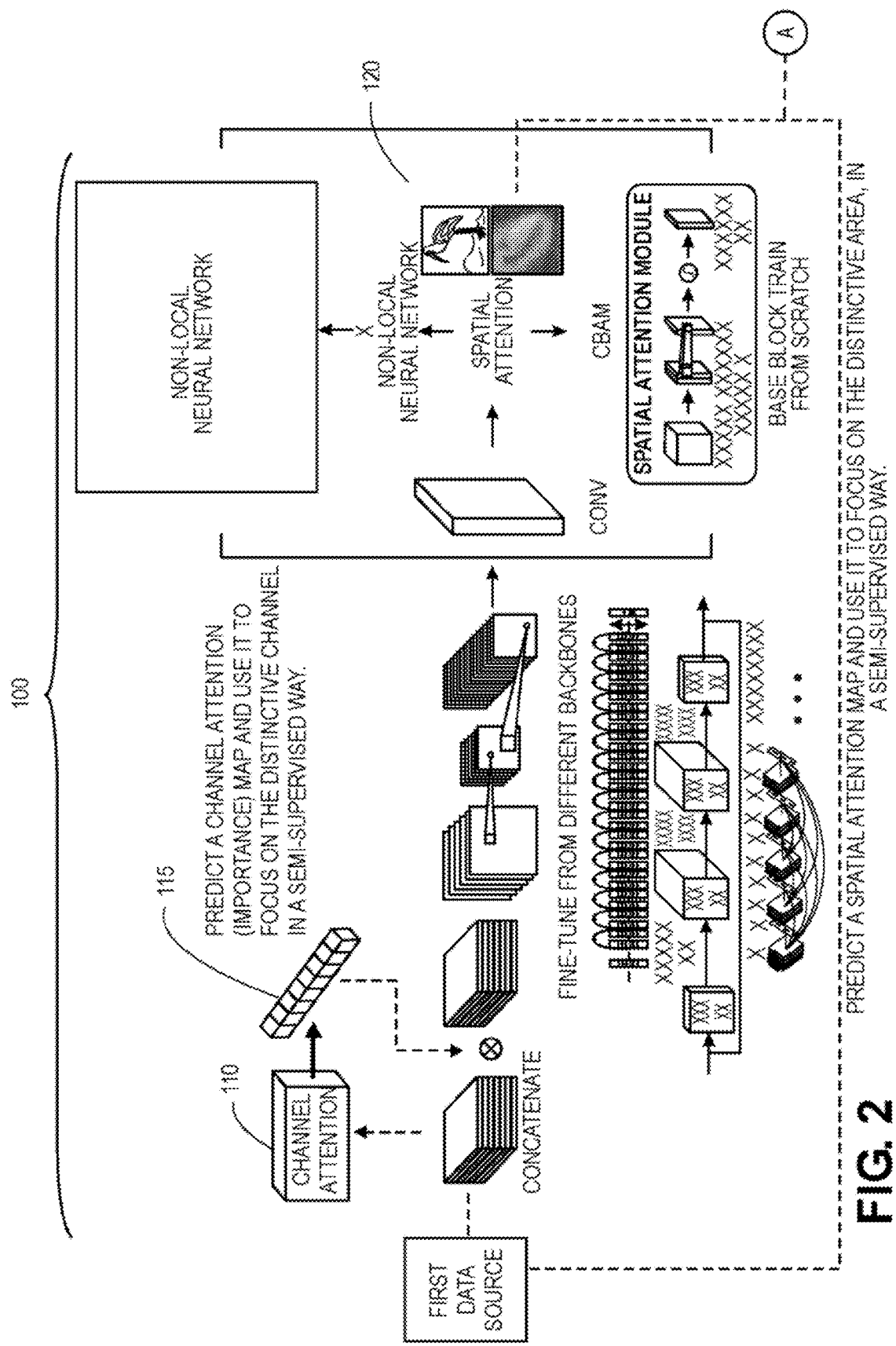
FIG. 2 is a diagram that depicts the classification method in more detail.
Figure 2:
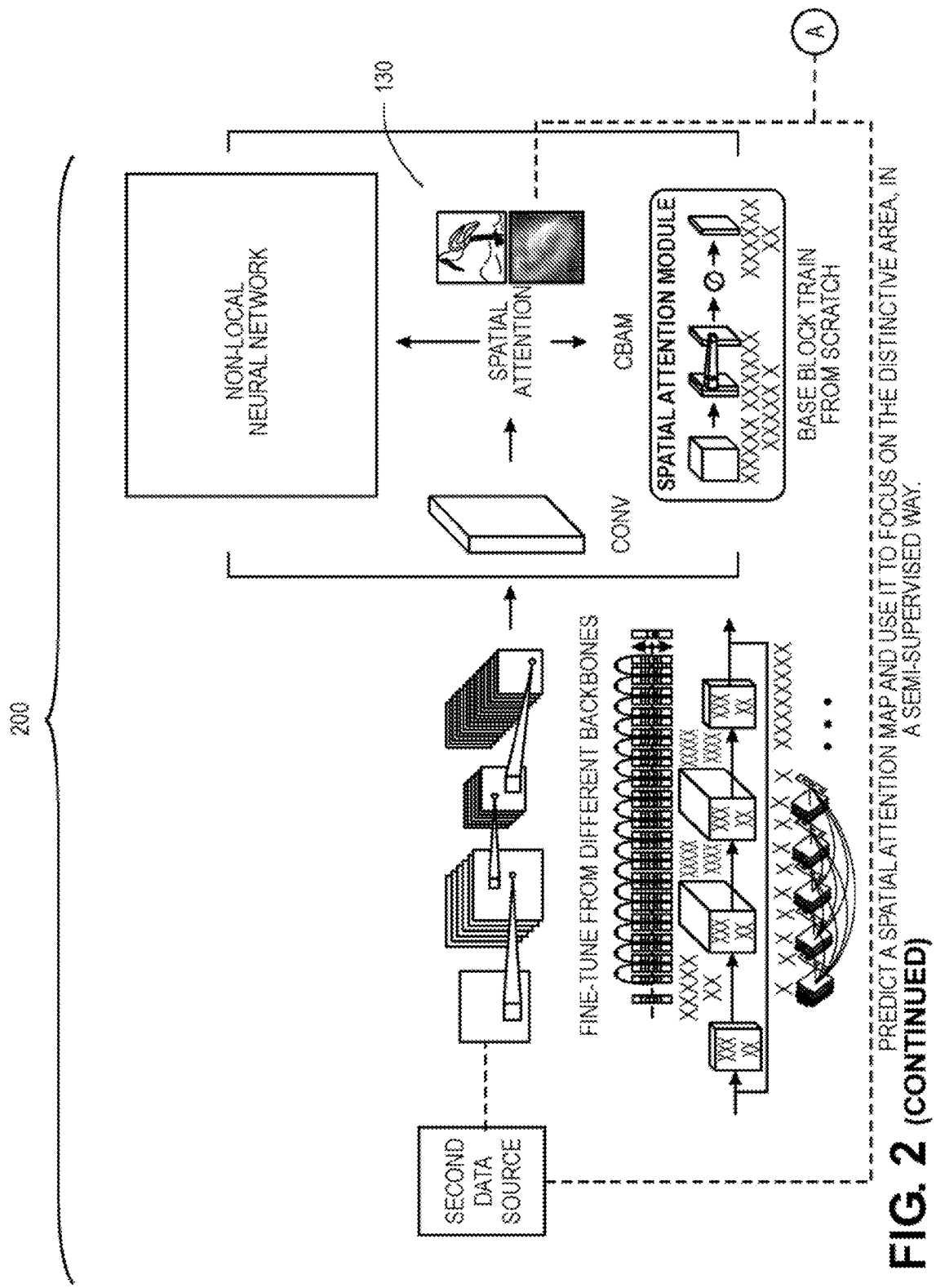
Figure 2:
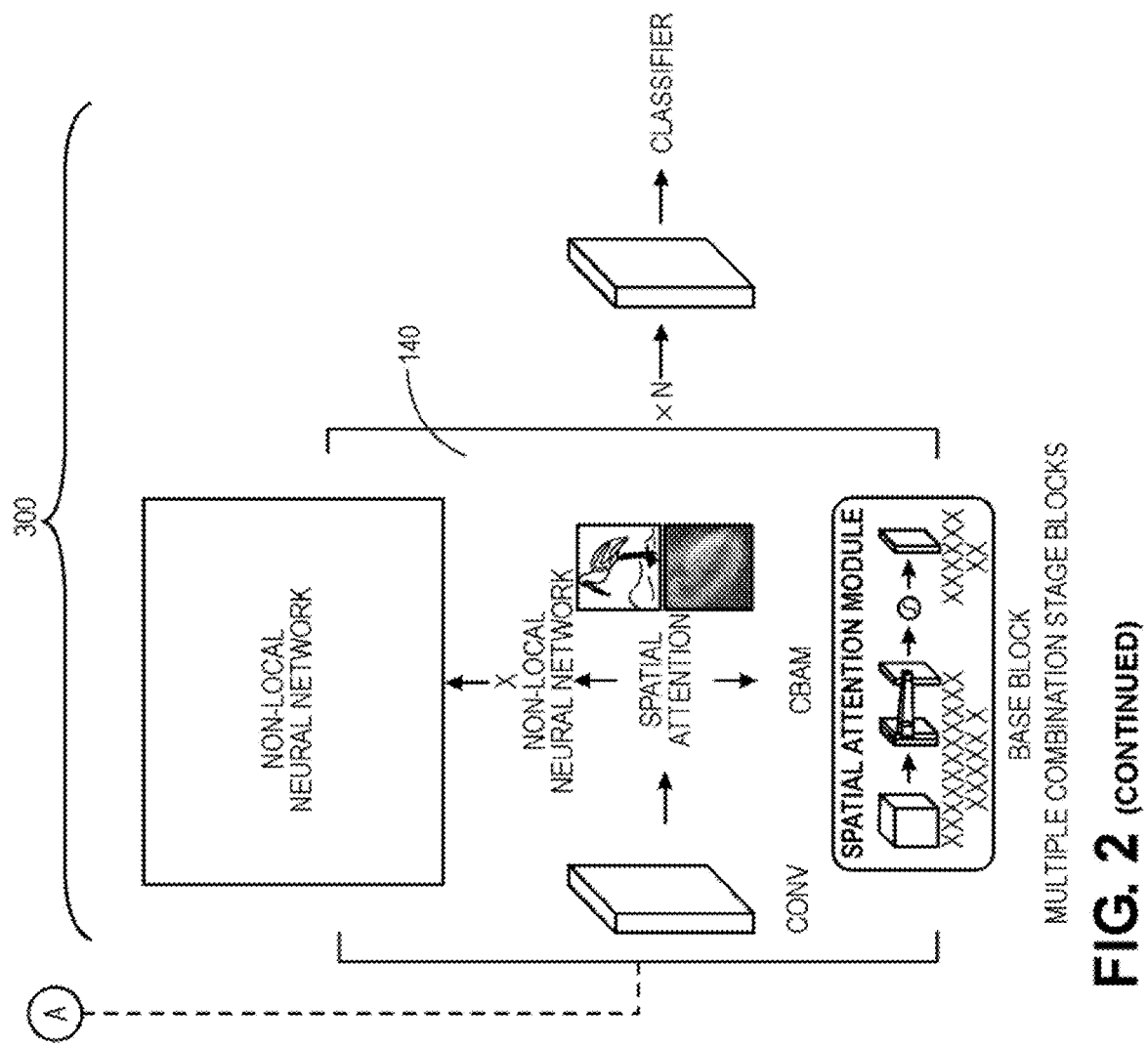

FIG. 2 depicts the classification method in more detail, in accordance with an embodiment of the inventive concept. As shown, the spectroscopy branch 100 and the microscopy branch 200 are tied into the joining convolutional layers 300. The spectroscopy branch 100 receives multiple images (e.g., the first set of data) from a first data source as input.

The spectroscopy branch 100 predicts a channel attention (importance) map 115 and uses it to focus on a distinctive channel associated with the target element in a semi-supervised way. EDS/HAADF output that is received by the spectroscopy branch 100 consists of multiple simultaneous images, each one highlighting a specific element. As mentioned above, the neural network branch that receives the multiple images includes an additional channel attention module 110. The multiple images are concatenated and subjected to the channel attention module 110 that indicates which element input channels to focus on, or pay additional attention to, based on the target element. The target element is determined by training the model end to end on the layer classification task. The channel attention module itself learns to assign different weights on different input sources to achieve an improvement of the final classification performance.

In addition to the channel attention module 110, the spectroscopy branch 100 has a CBAM 120 that includes a channel attention module and a spatial attention module. The CBAM 120 is trained iteratively from scratch. In the example embodiment of FIG. 2, MobileNetV2-CBAM is used for a block. The MobileNetV2 portion of the block is herein referred to as the "backbone," and is trained independently before being used on a large image classification dataset. FIG. 2 shows that the CBAM portion is trained from scratch and it could be integrated with any of the different backbones. As shown, the backbone portion is not trained from scratch but fine-tuned along with CBAM for the IBDI task.

As described above, the channel attention module includes a channel attention map configured to apply one or more weightings to one or more channels of the concatenated input images to focus attention on a target channel (e.g., corresponding to a target element). Once the channel attention map is converged, the spatial network module (including a space map network that represents a spatial relationship between the converged channel attention map and a final defect layer decision) is applied. The spectroscopy branch 100 predicts the space attention (importance) map and uses it to focus on the distinctive area in a semi-supervised way. The space attention map is adjusted based on the final predicted label (error type/no error).

The microscopy branch 200 receives an image from a second data source as input, and fine-tunes it from different backbones. A spatial attention module is applied, for example as a CBAM 130, and the microscopy branch 200 predicts the space attention map and uses it to focus on the distinctive area in a semi-supervised way. In the particular embodiment of FIG. 2, the microscopy branch 200 does not include a channel attention module 110 because a single image is used as input.

The outputs from the spectroscopy branch 100 and the microscopy branch 200 are fused into a fusion model 300 and trained. Fusing the outputs entails joining an output of the first branch 100 and an output of the second branch by concatenating the two outputs or performing an operation (e.g., dot product) on the two outputs. The fusion model 300 also includes a CBAM 140, and may include multiple blocks of CBAM 140. In the fusion model 300, the CBAM 140 is applied to each of the blocks individually (N, which indicates the depth of the neural network, is the number of blocks). To find the final fusion model that yields the best accuracy, different combinations of the first branch 100 and the second branch 200 may be tried to determine which combination yields the most accurate prediction of defect class. In more detail, for each single source of data, several models are constructed with different architecture and learning hyper-parameters, e.g., architecture of VGG neural network, architecture of mobilenet neural network, and/or architecture of residue neural network with different learning hyperparameters. Accordingly, the first branch 100 may include many different models and the second branch 200 may include many different models and even more possibilities for different combinations of models from the first branch 100 and second branch 200 may exist. Different models would capture different features.

The image classifier of this disclosure differs from conventional systems in a number of ways. First, in traditional systems, models are built and trained on single images, representing only color data channels. In this disclosure, models are built which take multiple images having multiple channels as samples, along with additional weighting/attention information derived from semi-supervised trained attention modules. The multiple images that are taken by the models of this disclosure have multiple channels that include non-traditional channels in addition to color channels as samples. This way, information from different modalities of imaging can be used to complement each other.

Also, the image classifier is structurally different from the traditional models. Rather than using a single, undivided neural network, two "branches" of neural networks are trained on different data sources, "frozen," and then linked with a final classifier network taking input from both of the lower branch networks to make a final prediction.

The semi-supervised defect localization task and the semi-supervised input element contribution analysis task are also distinguishing features of the method and system of this disclosure. More specifically, by using spatial attention to achieve semi-supervised defect localization, the defect region can be allowed even if the region was not originally provided as ground truth. By using channel attention to achieve semi-supervised input element contribution analysis, the ratio of how much each element contributes to the final decision can be determined, even though the ratios are not originally provided.

Figure 3:
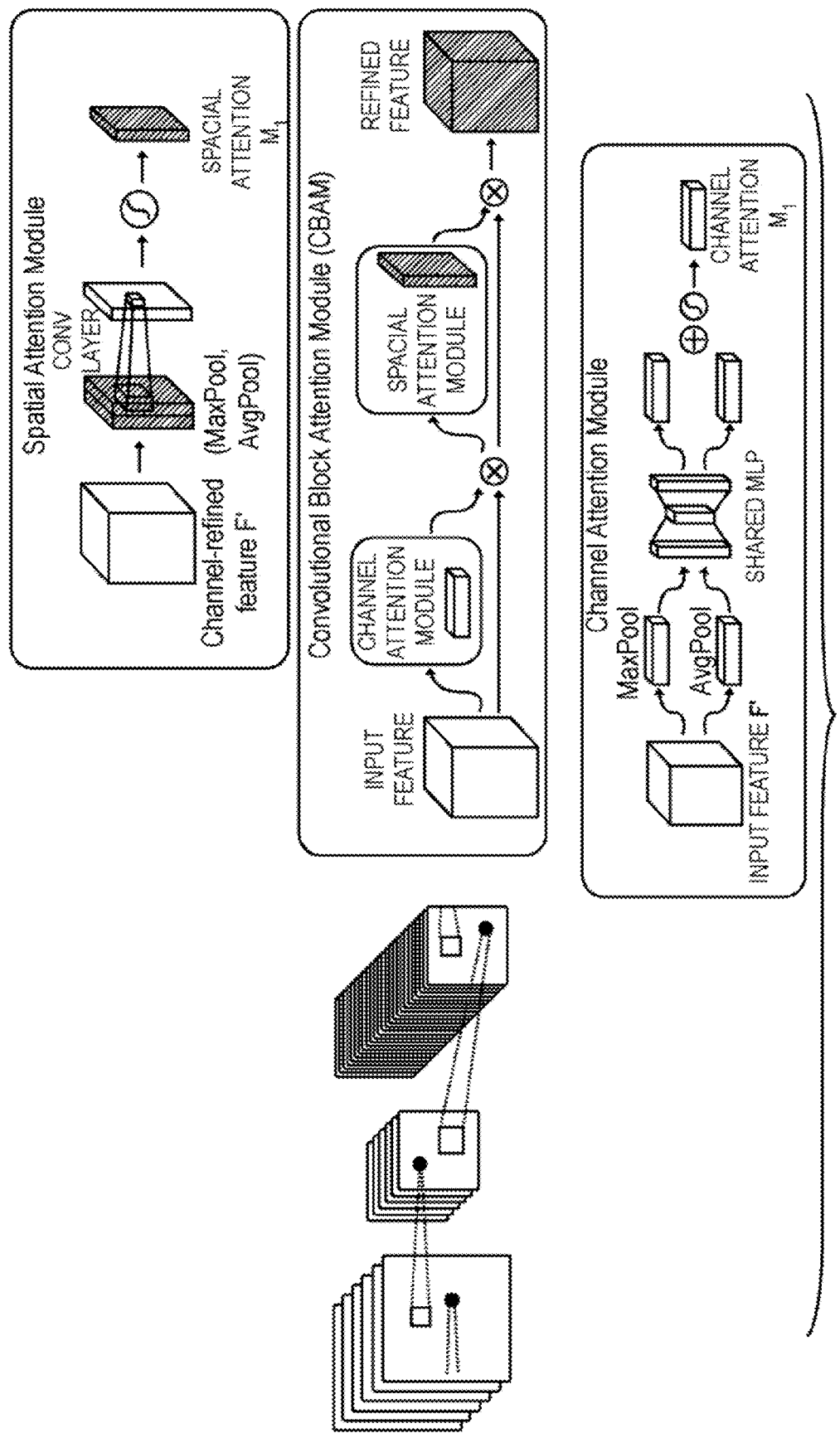
FIG. 3 depicts an example of a neural network branch that includes 15 MobileNetV2-CBAM blocks.

FIG. 3 depicts an example embodiment wherein each branch includes 15 MobileNetV2-CBAM blocks (N=15). The number of blocks, or "N," indicates the depth of the neural network configuration. In each block, there is a spatial attention module and a channel attention module. In the spectroscopy branch 100, there is an independent channel attention module 110 to assist with selecting the input channel related to the target element. This independent attention is a vector of X components (where X is the number of image input channels, each associated with an element being imaged), assigning a weight to each channel based on the chance that the element/chemical associated with the channel is the one causing the problem.

A CBAM receives a feature map as input, and sequentially infers a one-dimensional channel attention map and a two-dimensional spatial attention map. The channel attention module focuses on "what" is meaningful given an input image. The spatial attention module focuses on "where" the informative part is and is complementary to the channel attention. The specific method of computing the channel attention and spatial attention are known, and may be found in publications such as Woo, "CBAM: Convolutional Block Attention Module," ECCV 2018. In an example where a feature map $F \in R^{C \times H \times W}$ is received as input, the overall attention process may be summarized as follows:

$$F'=M_c(F) \otimes F,$$

$$F''=M_s(F') \otimes F',$$

wherein $\otimes$ denotes element-wise multiplication. During multiplication, the attention values are broadcasted (copied) accordingly: channel attention values are broadcasted along the spatial dimension, and spatial attention values are broadcasted along the channel dimension. F" is the output of the CBAM.

Semi-supervised defect localization is done from the spatial attention data. In each spatial attention module, the Neural Network predicts where (e.g., in an input image) the network should pay attention. Since there are multiple blocks in each branch, there are different spatial attentions from each block and these attentions are used to amplify each other's feature map. In more detail, since each CBAM block contains a spatial attention module and we have N blocks in the models with different resolutions, the spatial attentions are contributing to amplify each block's own feature under its own resolution. By comparing the human attention maps with the generated Neural Network feature importance, it can be confirmed that the Neural Network's attentions do in fact align with the importance patterns provided by humans—e.g., focusing on edges at lower levels and semantic locations at higher levels.

Figure 4:
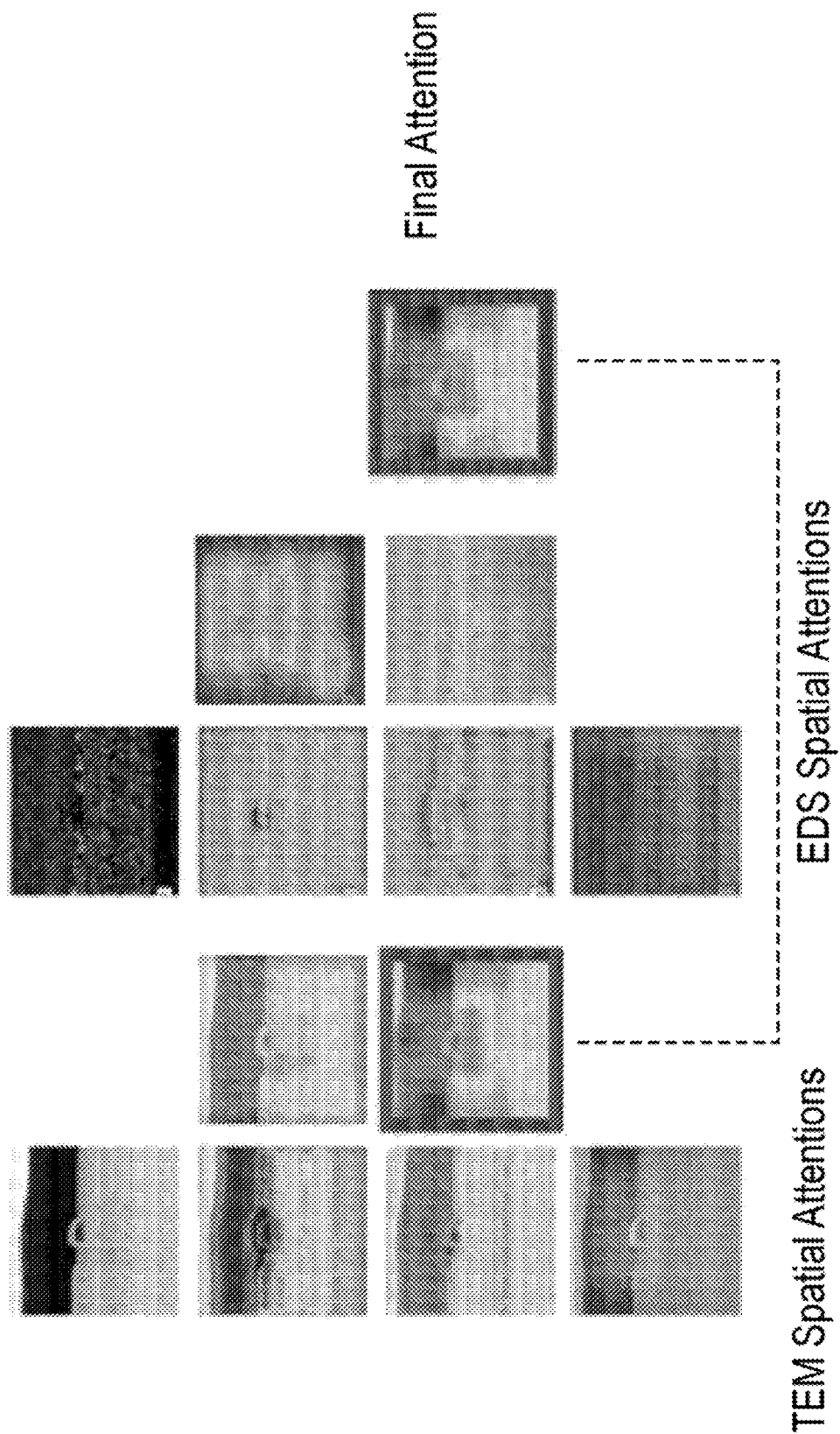
FIG. 4 depicts an examples of images input to two neural network branches and a selected final attention.

FIG. 4 illustrates this point by depicting a set of six microscopy images in one branch and a set of six spectroscopy images in another branch, all showing a defect region. The spectroscopy images differ from one another, as different elements are shown in each image even though they are all of the same region of a product. The six spectroscopy images may be output from the first branch 100. The microscopy images are all of the same region of a product, with spatial attention heat map overlaid so that different parameters are weighed differently in the six images. The six images may be output from the second branch 200. Applying the semi-supervised defect localization task and the semi-supervised input element contribution analysis, the final attention lands on one of the microscopy images. The fusion model 300 reviews all 12 images and selects the one that most accurately predicts the defect. A brief study of the images confirms that the chosen image indeed best shows the defect.

Data, such as the images of the first and second data source, can be augmented via zooming, flipping, and brightness/contrast distortions, amongst others, to provide additional data points if the amount of training data is low. The first data source and the second data source are not limited to being still images, as in the example embodiment described herein. For example, each of the first data source and the second data source may independently be video, text, image, Lidar data, radar data, image fusion data, etc. Where the product that is being tested is a display device, spectroscopy and microscopy images are taken of the display device, and the images would be put through the first and second branches. The fusion model 300 generates a defect prediction based on the outputs of the first and second branches.

While the embodiments are described in terms of a method or technique, it should be understood that the disclosure may also cover an article of manufacture that includes a non-transitory computer readable medium on which computer-readable instructions for carrying out embodiments of the method are stored. The computer readable medium may include, for example, semiconductor, magnetic, opto-magnetic, optical, or other forms of computer readable medium for storing computer readable code. Further, the disclosure may also cover apparatuses for practicing embodiments of the inventive concept disclosed herein. Such apparatus may include circuits, dedicated and/or programmable, to carry out operations pertaining to embodiments.

Figure 5:
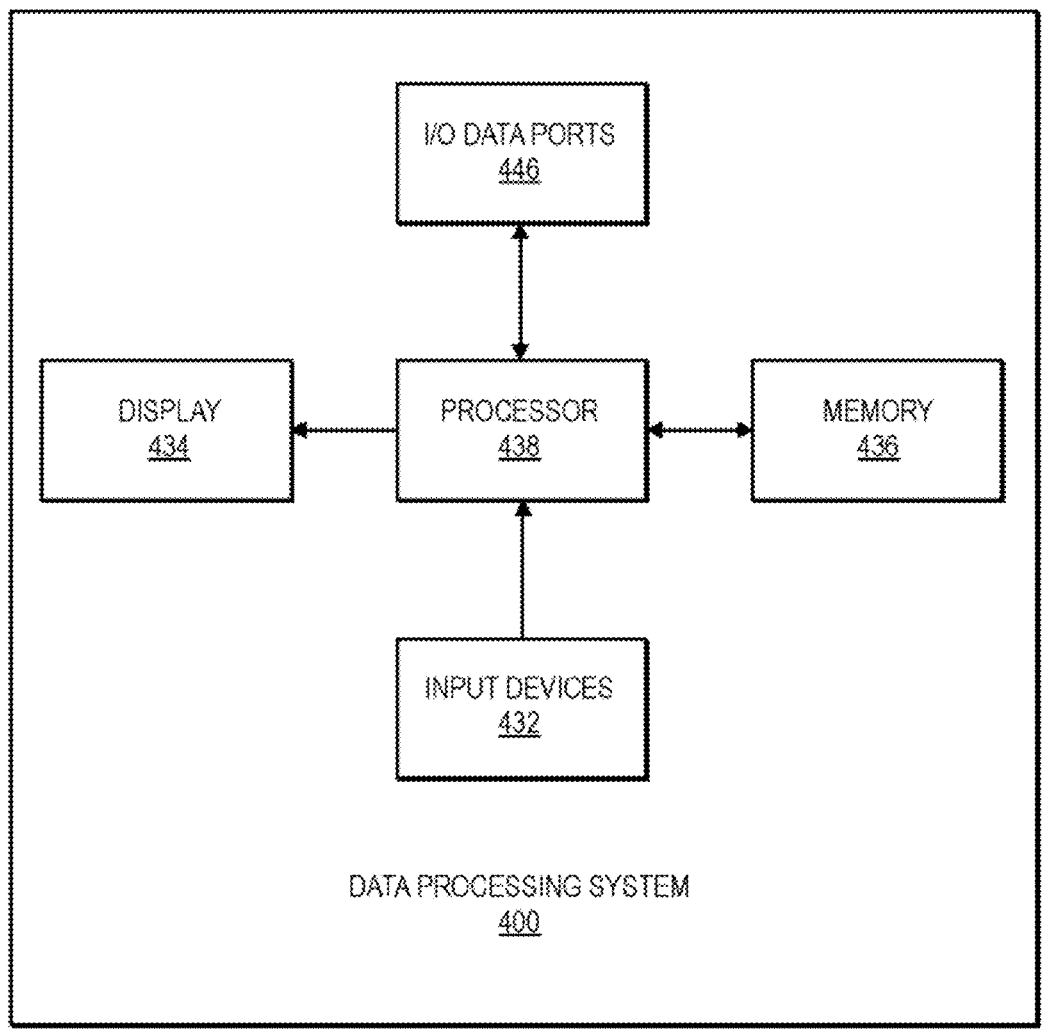
FIG. 5 is a block diagram of a data processing system suitable for use in accordance with embodiments of the inventive concept.

Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to the embodiments. FIG. 5 illustrates an exemplary embodiment of a data processing system 400 suitable for use in accordance with embodiments of the inventive concept. The data processing system 400 may connected to one or more of the first neural network branch 100, the second neural network branch 200, and the fusion model 300. The data processing system 400 typically includes input device(s) 432 such as a keyboard, mouse or keypad, a display 434, and a memory 436 that communicate with a processor 438. The data processing system 400 may further include an I/O data port(s) 446 that also communicates with the processor 438. The I/O data ports 446 can be used to transfer information between the data processing system 400 and another computer system or a network. These components may be conventional components, such as those used in many conventional data processing systems.

It should be understood that the inventive concept can be practiced with modification and alteration within the spirit and scope of the disclosure. The description is not intended to be exhaustive or to limit the inventive concept to the precise form disclosed.

What is claimed is:

1. A classification system comprising:
   one or more processors; and
   a memory storing instructions which, when executed by the one or more processors, cause performance of:
   receiving at a first neural network branch a first data as input and generating a first output, the first neural network branch being configured to apply a first attention map to the first data for identifying a first feature associated with the first output;
   receiving at a second neural network branch a second data as input and generating a second output, the second neural network branch being configured to apply a second attention map to the second data for identifying a second feature associated with the second output;
   receiving at a fusion neural network the first output and the second output; and
   generating by the fusion neural network a classification, the fusion neural network comprising a convolutional block attention module having a spatial attention module and a channel attention module.

2. The classification system of claim 1, wherein the first data and the second data are unaligned with respect to each other.

3. The classification system of claim 1, wherein one of the first data includes spectroscopy images, and
   wherein the second data includes microscopy images.

4. The classification system of claim 1, wherein the first neural network branch and the second neural network branch are trained independently from each other.

5. The classification system of claim 1, wherein the instructions, when executed by the one or more processors, further cause performance of:
   overlaying at least one of the channel attention module and the spatial attention module onto at least one of the first data and the second data, and
   wherein the channel attention module and the spatial attention module are trained in a semi-supervised manner such that extra weight is put on select parts of the first data or the second data.

6. The classification system of claim 5, wherein each of the first neural network branch and the second neural network branch comprises a plurality of blocks, and the convolutional block attention module having the channel attention module and the spatial attention module are overlaid on each one of the plurality of blocks.

7. A classification system comprising:
   one or more processors; and
   a memory storing instructions which, when executed by the one or more processors, cause performance of:
   receiving at a first neural network branch a first data as input and generating a first output, the first neural network branch being configured to apply a first attention map to the first data for identifying a first feature associated with the first output;
   receiving at a second neural network branch a second data as input and generating a second output, the second neural network branch being configured to apply a second attention map to the second data for identifying a second feature associated with the second output;
   receiving at a fusion neural network the first output and the second output, the fusion neural network including a convolutional block attention module; and
   generating by the fusion neural network a classification based on the convolutional block attention module.

8. The classification system of claim 1, wherein the first data comprise multiple images having multiple channels.

9. The classification system of claim 1, wherein the first data are Energy-Dispersive X-ray Spectroscopy (EDS) images.

10. The classification system of claim 1, wherein the first neural network branch and the second neural network branch are trained independently from each other.

11. A computer-implemented method for classification, comprising:
receiving a first output from a first neural network branch that takes first data as input, wherein the first neural network branch applies a first attention map to the first data and identifies a first feature associated with the first output;
receiving a second output from a second neural network branch that takes second data as input, wherein the second neural network branch applies a second attention map to the second data and identifies a second feature associated with the second output; and
inputting the first output and the second output into a fusion neural network to generate a classification, the fusion neural network comprising a convolutional block attention module having a spatial attention module and a channel attention module.

12. The computer-implemented method of claim 11, wherein the first data and the second data are not aligned with respect to each other.

13. The computer-implemented method of claim 11, wherein the first data includes spectroscopy images, and wherein one of the second data includes microscopy images.

14. The computer-implemented method of claim 11, wherein the first neural network branch and the second neural network branch are trained independently from each other.

15. The computer-implemented method of claim 11, further comprising overlaying the spatial attention module onto at least one of the first data and the second data, wherein the channel attention module and the spatial attention module are trained in a semi supervised manner to put on extra weight on select parts of the first data or the second data.

16. The computer-implemented method of claim 15, wherein the convolutional block attention module having the channel attention module and the spatial attention module are overlaid on a block in the first neural network branch or the second neural network branch.

17. The computer-implemented method of claim 11, wherein the first data are Energy-Dispersive X-ray Spectroscopy (EDS) images, the method further comprising:
applying the channel attention module to the first neural network branch to put additional weight to a channel of the first data, the channel corresponding to a target element.

18. The computer-implemented method of claim 11, wherein the first data comprise multiple channels.

19. The computer-implemented method of claim 11, further comprising overlaying the convolutional block attention module onto the fusion neural network.

20. The computer-implemented method of claim 11, further comprising augmenting at least one of the first data and the second data to provide additional data points for training.

* * * * *